(12) United States Patent
Hua et al.

(10) Patent No.: US 10,228,792 B2
(45) Date of Patent: Mar. 12, 2019

(54) TOUCH DETERMINING DEVICE AND METHOD, AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Lei Hua, Beijing (CN); Jian He, Beijing (CN); Site Cai, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 16/021,908

(22) Filed: Jun. 28, 2018

(65) Prior Publication Data

US 2018/0307359 A1 Oct. 25, 2018

Related U.S. Application Data (62) Division of application No. 15/521,737, filed as application No. PCT/CN2016/104978 on Nov. 8, 2016, now Pat. No. 10,037,097.

(30) Foreign Application Priority Data

Jan. 5, 2016 (CN) .......................... 2016 1 0005371

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0418* (2013.01); *G06F 2203/04112* (2013.01)

(58) Field of Classification Search
CPC .................. G06F 3/0412; G06F 3/044; G06F 2203/04112
See application file for complete search history.

(56) References Cited

U.S. PATENT DOCUMENTS

| 8,902,175 B2* | 12/2014 | Westerman | G06F 3/0235 345/173 |
| 2010/0097342 A1* | 4/2010 | Simmons | G06F 3/0416 345/174 |

(Continued)

FOREIGN PATENT DOCUMENTS

| CN | 101430627 A | 5/2009 |
| CN | 102819350 A | 12/2012 |

(Continued)

OTHER PUBLICATIONS

International Search Report dated Jan. 26, 2017; PCT/CN2016/104978.

(Continued)

*Primary Examiner* — Andrew Sasinowski
(74) *Attorney, Agent, or Firm* — Ladas & Parry LLP; Loren K. Thompson (57) ABSTRACT

A touch determining device and a touch determining method for a touch panel are provided. The touch panel includes multiple touch areas arranged in a matrix. The method includes: detecting whether a touch electrode has a touch area with a capacitance variation value larger than or equal to a predetermined value; if such touch areas exist, acquiring a number of the touch areas with a capacitance variation value larger than or equal to a predetermined value; if the number of the touch areas is one, no electrical signal of a touch area is outputted; if the number of the touch areas is multiple, outputting electrical signals of the multiple touch (Continued)

areas; and determining on the output electrical signals to decide whether to generate a touch signal, or not.

16 Claims, 5 Drawing Sheets

(56) References Cited

U.S. PATENT DOCUMENTS

| | | | | |
|---|---|---|---|---|
| 2011/0242052 A1* | 10/2011 | Ningrat | ................... | G06F 3/044 |
| | | | | 345/174 |
| 2013/0300696 A1 | 11/2013 | Haran et al. | | |
| 2014/0104194 A1* | 4/2014 | Davidson | .............. | G06F 3/0418 |
| | | | | 345/173 |
| 2014/0125678 A1* | 5/2014 | Wang | ................... | A63F 13/005 |
| | | | | 345/473 |
| 2015/0302554 A1* | 10/2015 | Costa | ...................... | G06F 3/041 |
| | | | | 345/174 |

FOREIGN PATENT DOCUMENTS

| | | |
|---|---|---|
| CN | 103186286 A | 7/2013 |
| CN | 105677121 A | 6/2016 |

OTHER PUBLICATIONS

USPTO NFOA dated Dec. 5, 2017 in connection with U.S. Appl. No. 15/521,737.

USPTO NOA dated Mar. 29, 2018 in connection with U.S. Appl. No. 15/521,737.

* cited by examiner

| B\A | 1 | 2 | 3 | 4 | 5 | 6 | 7 | 8 | 9 | 10 |
|---|---|---|---|---|---|---|---|---|---|---|
| 1 | 5 | 5 | 2 | 3 | 6 | 6 | 10 | 1 | 6 | 0 |
| 2 | 8 | 5 | 7 | 5 | 4 | 10 | 1 | 6 | 1 | 7 |
| 3 | 10 | 10 | 9 | 9 | 10 | 8 | 6 | 5 | 5 | 8 |
| 4 | 3 | 10 | 3 | 9 | 4 | 6 | 8 | 5 | 7 | 5 |
| 5 | 7 | 4 | 2 | 7 | 5 | 8 | 5 | 8 | 7 | 3 |
| 6 | 7 | 10 | 1 | 0 | 1 | 4 | 4 | 9 | 10 | 1 |
| 7 | 2 | 8 | 6 | 5 | 7 | 1 | 5 | 1 | 4 | 2 |
| 8 | 4 | 3 | 4 | 3 | 6 | 1 | 0 | 9 | 0 | 1 |
| 9 | 9 | 4 | 2 | 7 | 5 | 7 | 9 | 0 | 7 | 2 |
| 10 | 4 | 4 | 10 | 4 | 8 | 6 | 0 | 3 | 2 | 2 |

Fig. 3

| B\A | 1 | 2 | 3 | 4 | 5 | 6 | 7 | 8 | 9 | 10 |
|---|---|---|---|---|---|---|---|---|---|---|
| 1 | 5 | 5 | 2 | 3 | 6 | 6 | 10 | 1 | 6 | 0 |
| 2 | 8 | 5 | 7 | 5 | 4 | 10 | 1 | 6 | 1 | 7 |
| 3 | 10 | 10 | 9 | 9 | 10 | 8 | 6 | 5 | 5 | 8 |
| 4 | 3 | 10 | 3 | 9 | 24 | 6 | 8 | 5 | 7 | 5 |
| 5 | 7 | 4 | 2 | 101 | 169 | 70 | 5 | 8 | 7 | 3 |
| 6 | 7 | 10 | 1 | 44 | 38 | 22 | 4 | 9 | 10 | 1 |
| 7 | 2 | 8 | 6 | 5 | 7 | 1 | 5 | 1 | 4 | 2 |
| 8 | 4 | 3 | 4 | 3 | 6 | 1 | 0 | 9 | 0 | 1 |
| 9 | 9 | 4 | 2 | 7 | 5 | 7 | 9 | 0 | 7 | 2 |
| 10 | 4 | 4 | 10 | 4 | 8 | 6 | 0 | 3 | 2 | 2 |

Fig. 4

| B\A | 1 | 2 | 3 | 4 | 5 | 6 | 7 | 8 | 9 | 10 |
|---|---|---|---|---|---|---|---|---|---|---|
| 1 | 5 | 5 | 2 | 3 | 6 | 6 | 10 | 1 | 6 | 0 |
| 2 | 8 | 5 | 7 | 5 | 4 | 10 | 1 | 6 | 1 | 7 |
| 3 | 10 | 10 | 9 | 9 | 10 | 8 | 6 | 5 | 5 | 8 |
| 4 | 3 | 10 | 3 | 9 | 4 | 6 | 8 | 5 | 7 | 5 |
| 5 | 7 | 4 | 2 | 7 | 118 | 8 | 5 | 8 | 7 | 3 |
| 6 | 7 | 10 | 1 | 0 | 1 | 4 | 4 | 9 | 10 | 1 |
| 7 | 2 | 8 | 6 | 5 | 7 | 1 | 5 | 1 | 4 | 2 |
| 8 | 4 | 3 | 4 | 3 | 6 | 1 | 0 | 9 | 0 | 1 |
| 9 | 9 | 4 | 2 | 7 | 5 | 7 | 9 | 0 | 7 | 2 |
| 10 | 4 | 4 | 10 | 4 | 8 | 6 | 0 | 3 | 2 | 2 |

| B\A | 1 | 2 | 3 | 4 | 5 | 6 | 7 | 8 | 9 | 10 |
|---|---|---|---|---|---|---|---|---|---|---|
| 1 | 5 | 5 | 2 | 3 | 6 | 6 | 10 | 1 | 6 | 0 |
| 2 | 8 | 5 | 90 | 5 | 4 | 10 | 1 | 6 | 1 | 7 |
| 3 | 10 | 10 | 9 | 9 | 10 | 8 | 6 | 5 | 5 | 8 |
| 4 | 3 | 10 | 3 | 9 | 4 | 6 | 8 | 5 | 7 | 5 |
| 5 | 7 | 4 | 2 | 7 | 118 | 8 | 5 | 8 | 7 | 3 |
| 6 | 7 | 10 | 1 | 0 | 1 | 4 | 4 | 9 | 10 | 1 |
| 7 | 2 | 8 | 6 | 5 | 7 | 1 | 5 | 1 | 4 | 2 |
| 8 | 4 | 3 | 4 | 3 | 6 | 1 | 0 | 9 | 0 | 1 |
| 9 | 9 | 4 | 2 | 7 | 5 | 7 | 88 | 0 | 7 | 2 |
| 10 | 4 | 4 | 10 | 4 | 8 | 6 | 0 | 3 | 2 | 2 |

Fig. 7

Fig. 8

TOUCH DETERMINING DEVICE AND METHOD, AND DISPLAY DEVICE

FIELD OF THE ART

Embodiments of the present disclosure relate to a touch determining method, a touch determining device, and a display device.

BACKGROUND

Figure 1:
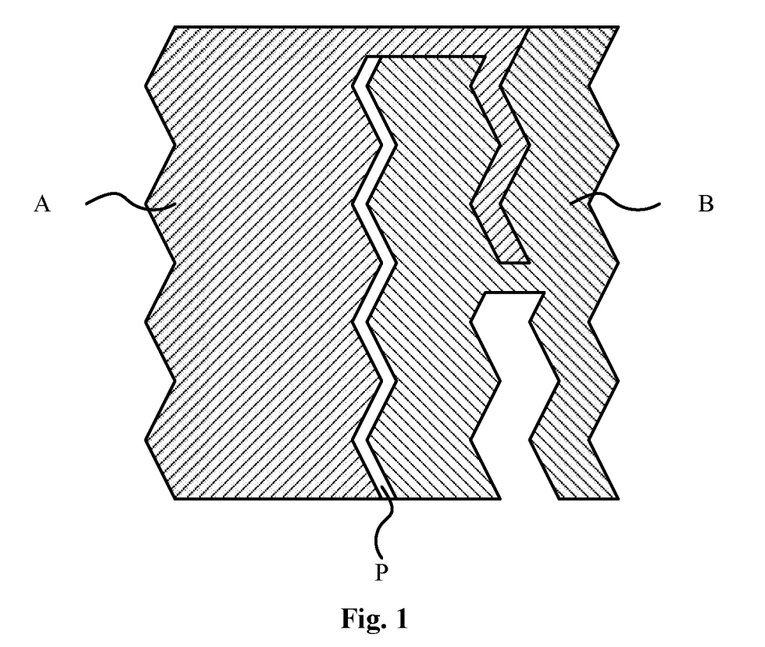
FIG. 1 schematically illustrates a structural diagram of touch areas in a capacitive sensor of a touch display device.

A capacitance sensor of a touch display device is generally located below a protective cover, where an electrode A and an electrode B are patterned in a certain way to form a two-dimensional matrix, each touch area (as illustrated in FIG. 1) of the matrix corresponds to a characteristic capacitance.

As the electrode A and the electrode B are located in the same layer, a gap between the two electrodes is designed to prevent a short circuit. Moreover, some suspension blocks P have to be inserted between the electrode A and the electrode B to improve visual effect. Due to the affect from manufacturing processes or dust in a factory, however, it is likely that an instable short circuit may occur between the electrodes A and B as well as the suspension blocks. For example, metal particles between the suspension block P and the electrode A will change its contacting status with the suspension block P and the electrode A when the touch control devices vibrates, such that variation values of the characteristic capacitance under different stages change dramatically, resulting in a touch event. But such touch event is actually not intended under these circumstances, that is, an undesired mis-determination happened.

SUMMARY

According to embodiments of the present disclosure, a touch determining method for a touch panel is provided. The touch panel comprises a plurality of touch areas arranged in a matrix. The method comprising: detecting whether a touch electrode has a touch area with a capacitance variation value larger than or equal to a predetermined value; if touch areas with a capacitance variation value larger than or equal to a predetermined value are detected, acquiring a number of the touch areas; if the number of the touch areas is one, no electrical signal of the touch areas is outputted; if the number of the touch areas is multiple, outputting electrical signals of the touch areas; and determining on the outputted electrical signals to decide whether to generate a touch signal, or not.

For example, the touch determining method further comprises: determining whether all of the outputted electrical signals are from separate touch areas; if not all of the outputted electrical signals are from separate touch areas, generating a touch signal; and if all of the outputted electrical signals are from separate touch areas, not generating a touch signal.

For example, the touch determining method further comprises: if not all of the outputted electrical signals are from separate touch areas, determining adjacent touch areas from the multiple touch areas, and generating a touch signal based on an electrical signal outputted from a location of a touch area at a substantial center of the adjacent touch areas.

For example, the touch determining method further comprises: if not all of the outputted electrical signals are from separate touch areas, determining adjacent touch areas from the multiple touch areas, and generating a touch signal based on an electrical signal outputted from a location of a touch area with a largest capacitance variation value of the adjacent touch areas.

For example, the touch determining method further comprises: if the number of the touch areas is 1, recording a location of a touch area; and if the number of the touch areas is multiple, recording locations of separate touch areas of the multiple touch areas.

For example, the touch panel comprises at least one first touch electrode and at least one second touch electrode, and any of the at least one first touch electrode and any of the at least one second touch electrode overlap with each other to form one touch area.

According to embodiments of the present disclosure, a touch determining device for a touch panel is provided. The touch panel comprises a plurality of touch areas arranged in a matrix. The device comprises: a detecting unit configured to detect whether a touch electrode has a touch area with a capacitance variation value larger than or equal to a predetermined value; an acquiring unit configured to acquire a number of the touch areas with a capacitance variation value larger than or equal to a predetermined value, in condition that such touch areas exist; an outputting unit configured to not output an electrical signal, in condition that the number of the touch areas is one, and output electrical signals of the multiple touch areas, in condition that the number of the touch areas is multiple; and an analyzing unit configured to determine on the outputted electrical signals to decide whether to generate a touch signal, or not.

For example, the analyzing unit comprises: a determining sub-unit configured to determine whether all of the outputted electrical signals are from separate touch areas; and a signal generating sub-unit configured to generate a touch signal in condition that not all of the outputted electrical signals are from separate touch areas, and not generate a touch signal in condition that all of the outputted electrical signals are from separate touch areas.

For example, the signal generating sub-unit is configured to determine adjacent touch areas from the multiple touch areas, and generate a touch signal based on an electric signal outputted from a location of a touch area at the substantial center of the adjacent touch areas, in condition that not all of the outputted electrical signals are from separate touch areas.

For example, the signal generating sub-unit is configured to determine adjacent touch areas from the multiple touch areas, and generate a touch signal based on an electric signal outputted from a location of a touch area with a largest capacitance variation value of the adjacent touch areas, in condition that not all of the outputted electrical signals are from separate touch areas.

For example, the touch determining device further comprises a recording unit configured to record a location of a touch area in condition that the number of the touch areas is 1, and record locations of separate touch areas in condition that the number of the touch areas is multiple.

For example, the touch panel comprises at least one first touch electrode and at least one second touch electrode, any of the at least one first touch electrode and any of the at least one second touch electrode overlap with each other to form one touch area.

Embodiments of the present disclosure also provide a display device comprising the touch determining device.

BRIEF DESCRIPTION OF THE DRAWINGS

Embodiments of the present disclosure will be described in more detail below with reference to accompanying drawings to allow an ordinary skill in the art to more clearly understand embodiments of the present disclosure, in which.

DETAILED DESCRIPTION

Technical solutions according to the embodiments of the present disclosure will be described clearly and fully as below in conjunction with the accompanying drawings of embodiments of the present disclosure. It is apparent that the described embodiments are just a part but not all of the embodiments of the disclosure. Based on the described embodiments herein, a person of ordinary skill in the art can obtain other embodiment(s), without any creative work, which shall be within the scope of the present disclosure.

Unless otherwise defined, all of the technical and scientific terms used herein have the same meanings as commonly understood by a person of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

It is noted that embodiments and features of the embodiments of the disclosure are interchangeable when they are not contradicted each other.

The following description describes many details to facilitate full understanding of embodiments of the present disclosure, however, the embodiments of the disclosure may be implemented in other ways different as described herein. Therefore, the scope of the present disclosure is not limited by the following exemplary embodiments.

Figure 2:
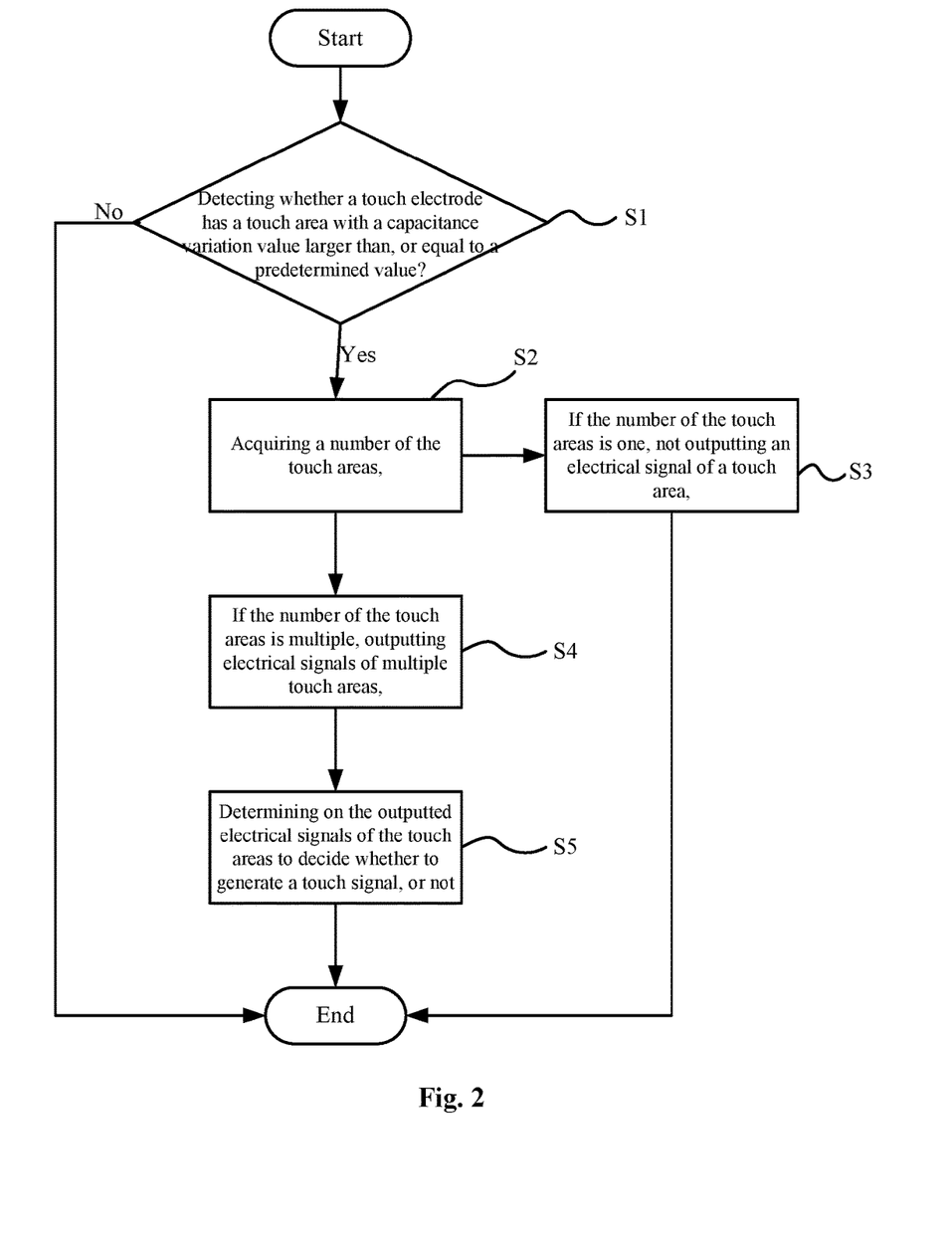
FIG. 2 schematically illustrates a flow chart of a touch determining method in accordance with an embodiment of the present disclosure.

As illustrated in FIG. 2, a touch determining method for a touch panel in accordance with an embodiment of the disclosure is shown. The touch panel comprises a plurality of touch areas arranged in a matrix, the method comprises following steps.

S1, detecting whether a touch electrode has a touch area with a capacitance variation value larger than or equal to a predetermined value;

S2, if touch areas with a capacitance variation value larger than or equal to a predetermined value are detected, acquiring a number of the touch areas;

S3, if the number of the touch areas is one, not outputting an electrical signal of a touch area;

S4, if the number of the touch areas is multiple, outputting electrical signals of multiple touch areas;

S5, determining on the outputted electrical signals of the touch areas to decide whether to generate a touch signal, or not.

In a capacitive sensor, as metal particles between a suspension block P and an electrode A is extremely small, normally only the suspension block P in one touch area (also known as a node) may be in contact with the electrode A, or the electrode B. In this case, normally, there is only one touch area with a capacitance variation value larger than or equal to a predetermined value.

A real touch operation is performed by an object, for example, a user's finger presses a capacitive sensor, while a contacting surface between the object, such as a finger, and a capacitive sensor may cover multiple touch areas. In this case, when the user presses the touch electrode, multiple areas in the capacitive sensor with a capacitance variation value larger than or equal to a predetermined value will be presented.

In this way, it can determine that a touch operation occurs, when there are multiple areas in the capacitive sensor with a capacitance variation value larger than or equal to a predetermined value, then the outputted electrical signals of the touch areas are analyzed to decide whether to generate a touch signal, or not. In this way, a probability of mistakenly generating a touch signal due to a short circuit between the suspension blocks and the electrodes can be reduced, to allow the touch signals to be accurately generated.

Figure 3:
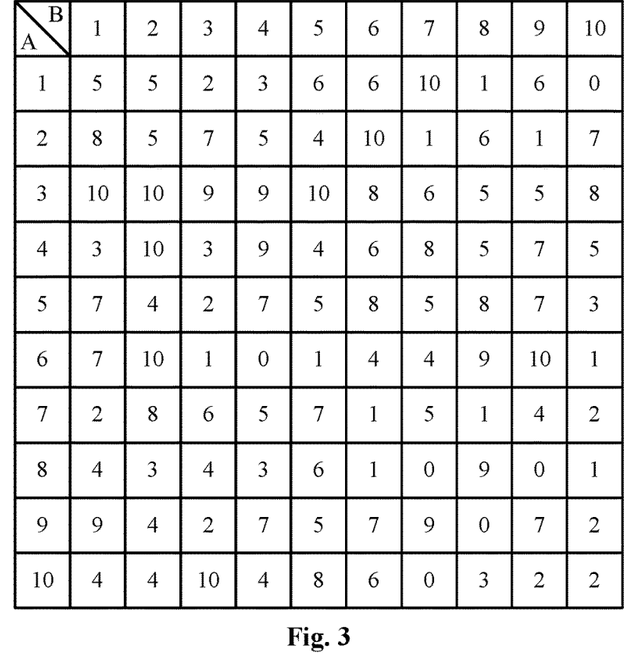
FIG. 3 schematically illustrates capacitance variation values of touch areas in a capacitive sensor in accordance with an embodiment of the present disclosure.

As shown in FIG. 3, each square represents a touch area, a digit in a square represent a capacitance variation value of the touch area corresponding to the square. Normally, a variation Cm of each touch area in the capacitive sensor is mostly influenced by external noises, while the external noises may only cause extremely weak variation in Cm. If a predetermined value used for determining a triggering of a touch signal is 70 $\mu F$, a maximum variation Cm caused by the external noises will be 10 $\mu F$, which is far less than 70 $\mu F$ and would not lead to output of electrical signals of the touch areas, that is, no touch signals will be generated.

Figure 4:
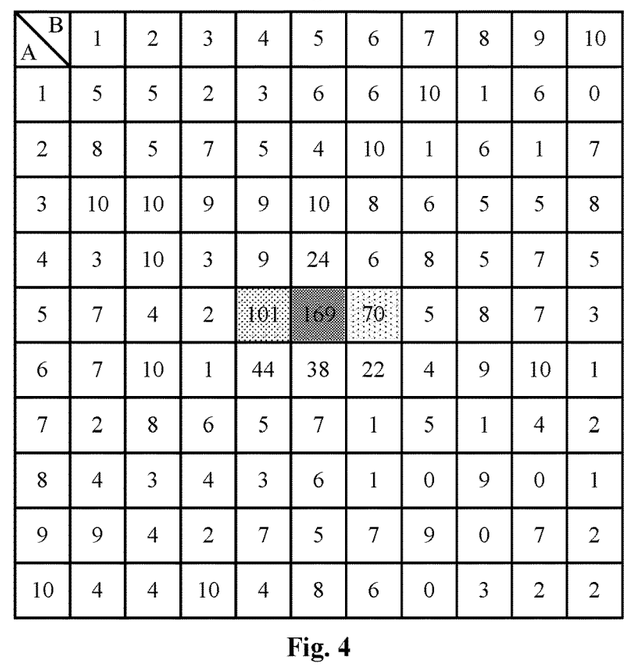
FIG. 4 schematically illustrates capacitance variation values of touch areas in a capacitive sensor in accordance with another embodiment of the present disclosure.

As shown in FIG. 4, when a user's finger touches a touch screen, a contacting surface between the finger and the capacitive sensor will cover multiple touch areas. Therefore, when the user presses the capacitive sensor, multiple touch areas in the capacitive sensor with a capacitance variation value larger than or equal to a predetermined value will be presented. For example, a touch area in the fourth row and fifth column, touch areas in the fifth row and fourth to sixth columns and touch areas in the sixth row and fourth to sixth columns all change quite a lot in their capacitance values, where the touch areas in the fifth row and fourth to sixth columns change respectively by 101 $\mu F$, 169 $\mu F$ and 70 $\mu F$ in their capacitance values. It is thereby determined that a touch operation occurs, and electrical signals of the touch areas are outputted. A touch signal is then generated after further analysis.

Figure 5:
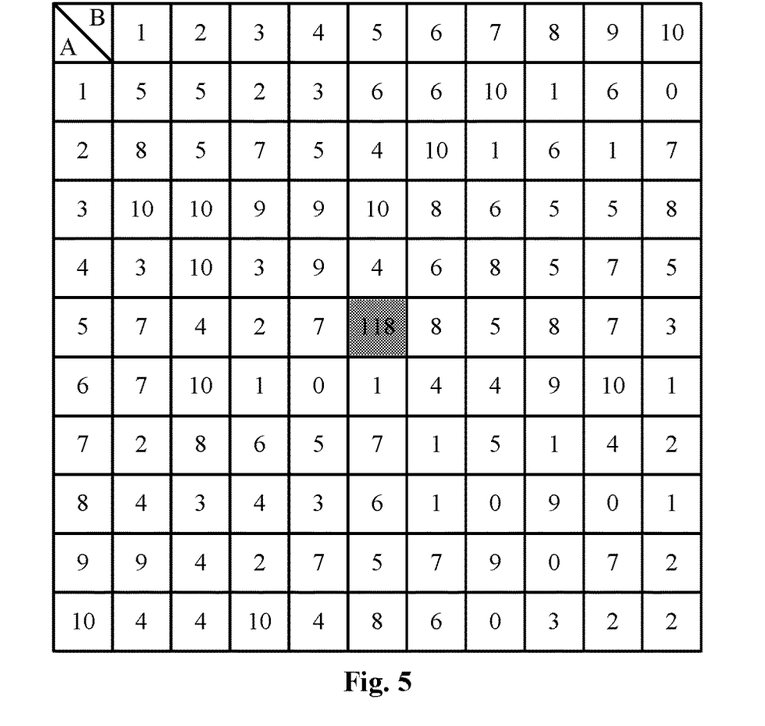
FIG. 5 schematically illustrates capacitance variation values of touch areas in a capacitive sensor in accordance with still another embodiment of the present disclosure.

As illustrated in FIG. 5, only a touch area in the fifth row and fifth column of the capacitive sensor has a capacitance variation value (118 μF) larger than 70 μF. In a capacitive sensor, metal particles between a suspension block P and an electrode A is extremely small, generally only the suspension block P in one touch area may be in contact with the electrode A, or the electrode B. In this way, for the case as shown in FIG. 5, though a touch area with a capacitance variation value larger than or equal to a predetermined value is presented, however, it is determined that it is not a triggering action to the panel purposely by a user. Therefore, no electrical signal of the touch area is outputted, that is, no touch signal is generated.

Figure 6:
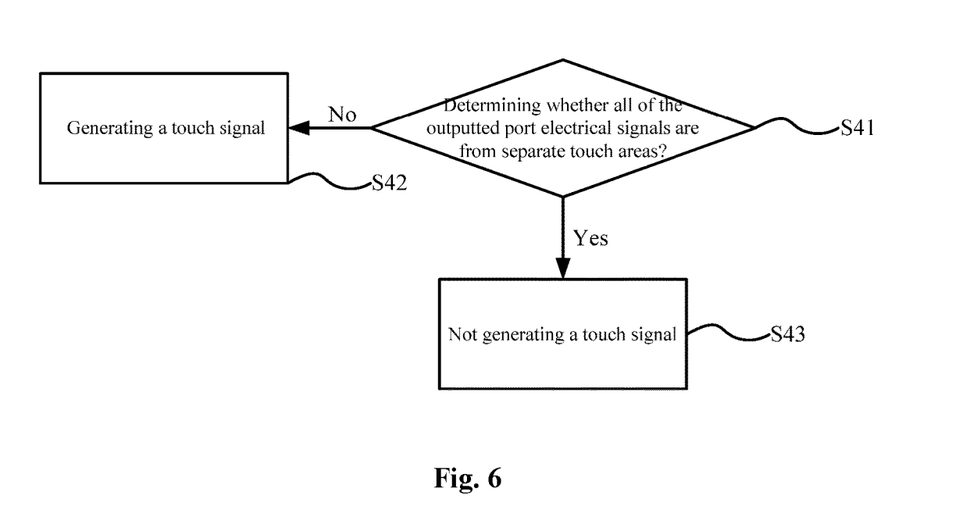
FIG. 6 schematically illustrates a flow chart of determining when capacitance variation values of multiple touch areas are larger than or equal to a predetermined value, in accordance with still another embodiment of the present disclosure.

As illustrated in FIG. 6, for example, the step of determining on the outputted electrical signals of the touch areas to decide whether to generate a touch signal, or not, comprises:

S51: determining whether all of the outputted electrical signals are from separate touch areas;

S52: if not all of the outputted electrical signals are from separate touch areas, generating a touch signal;

S53: if all of the outputted electrical signals are from separate touch areas, not generating a touch signal.

In some cases, metal particles may be present in multiple touch areas, which will make suspension blocks P in the multiple touch areas to contact the electrode A, or the electrode B, causing multiple touch areas to have capacitance variation values larger than or equal to the predetermined value. But, as there are many touch areas in the touch electrode, those touch areas with suspension blocks contacting the electrode normally are not adjacent to each other, that is, they are separate.

In this way, when multiple touch areas with capacitance variation values larger than or equal to the predetermined value are present, while the touch areas are separate, it may also determine that each touch area indicates a wrong touch signal caused by the short circuit of the suspension blocks and the electrode, and it may determine that a touch operation from the user happens when the multiple touch areas are not separate touch areas.

Figure 7:
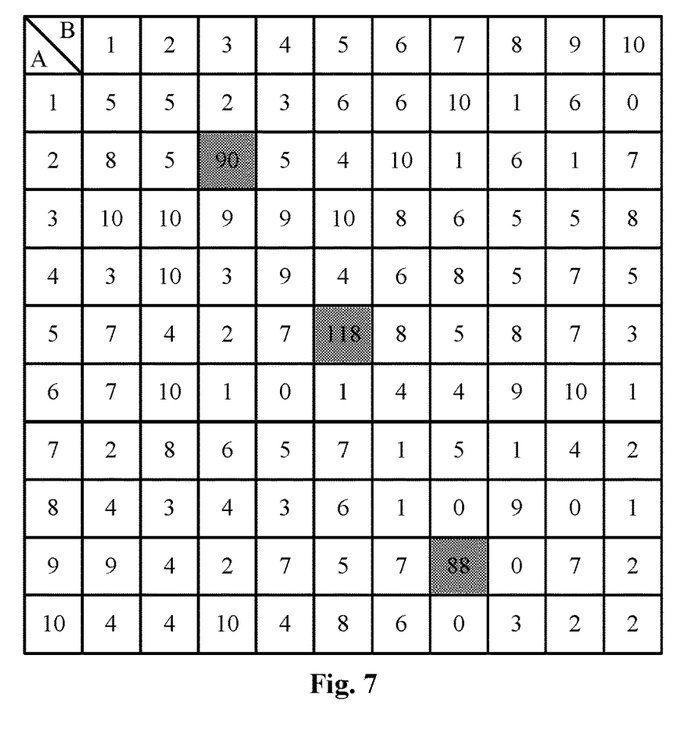
FIG. 7 schematically illustrates capacitance variation values of touch areas in a capacitive sensor in accordance with yet another embodiment of the present disclosure.

For example, as illustrated in FIG. 7, capacitance variation values of touch areas at the second row and the third column, the fifth row and the fifth column, and the ninth row and the seventh column are all larger than a predetermined value. But the three touch areas are separate from each other. Then it is very unlikely that they are caused by a user's operation, while it is quite likely that they are caused by metal particles in the multiple touch areas. In this way, it may be determined that the outputted electrical signals are all from separate touch areas and no touch signal will be generated.

Based on the above embodiment, further determination is only made when multiple touch areas with capacitance variation values larger than or equal to the predetermined value are present, which improves the accuracy of the determination result.

For example, the touch determining method further comprises: when not all of the outputted electrical signals are from separate touch areas, adjacent touch areas are determined from the multiple touch areas, and a touch signal is generated based on an electrical signal outputted from a location of a touch area at the substantial center of the adjacent touch areas. The touch signal generated in the embodiment comprises location information of a touch area at the substantial center, and it also comprises location information of other touch areas of the multiple touch areas, where the location information of the touch area at the substantial center of the touch areas may assume a lager weight, while the location information of other touch areas assume less weight.

For example, the touch determining method further comprises: when not all of the outputted electrical signals are from separate touch areas, adjacent touch areas are determined from the multiple touch areas, and a touch signal is generated based on an electrical signal outputted from a location of a touch area with the maximum capacitance variation value. The touch signal generated in the embodiment comprises location information of a touch area with the maximum capacitance variation value, and it also comprises location information of other touch areas of the multiple touch areas, where the location information of the touch area with the maximum capacitance variation value may assume a lager weight, while the location information of other touch areas assume less weight.

The touch signal may be generated based on several factors, which may be determined in advance, or adjusted anytime when needed. For example, when the multiple adjacent touch areas may roughly define a central touch area, like the touch area at the fifth row and the fifth column of FIG. 4, it shows that a touch target by a user is closest to the central touch area, in this way, the touch signal may be generated based on the location information of the central touch area.

If the multiple adjacent touch areas may not define a central touch area, for example, the multiple adjacent touch areas comprise only two touch areas, or totally four touch areas in two rows and two columns, as the user usually applies a largest pressure to the touch target, that is, the touch area closest to the touch target will have the largest capacitance variation value. Therefore, the touch signal may be generated based on the location information of the touch area with the largest capacitance variation value, and the accuracy of determining the touch area corresponding to the touch signal is improved.

For example, the touch determining method may further comprise the following steps.

If the number of the touch areas is one, recording a location of a touch area;

If the number of the touch areas is multiple, recording locations of separate touch areas.

It is known from the above embodiment that metal particles present between the suspension blocks and the electrodes may cause wrong determination of the touch signal, while a separate touch area with a capacitance variation value larger than or equal to a predetermined value is a touch area with a metal particle. By recording such touch areas, they may be processed (for example, removing the metal particle therein) accurately in the subsequent repair, to prevent the metal particle from triggering wrong determination of the touch signal again.

For example, the touch panel comprises at least one first touch electrode and at least one second touch electrode, any of the first touch electrodes and any of the second touch electrodes overlap with each other to form one touch area.

Figure 8:
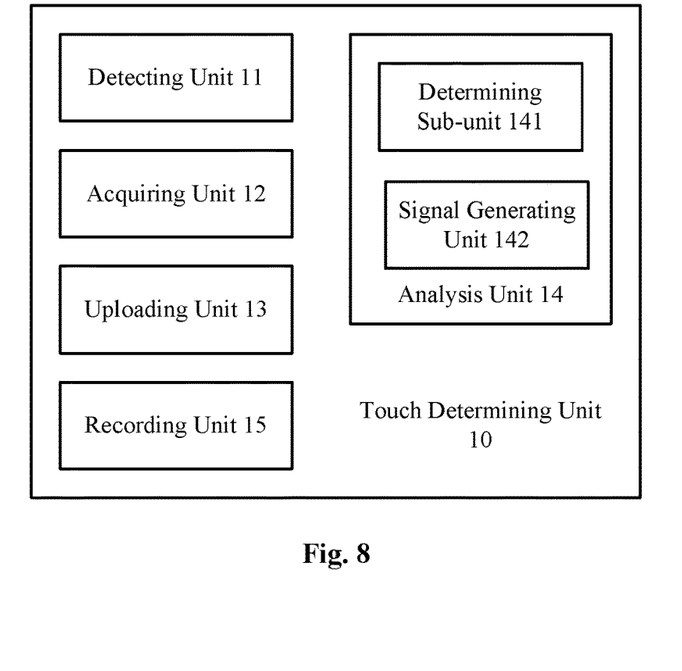
FIG. 8 illustrates a schematic block diagram of a touch determining device in accordance with yet another embodiment of the present disclosure.

As illustrated in FIG. 8, an embodiment of the present disclosure further provides a touch determining device 10 for a touch panel. The touch panel comprises a plurality of touch areas arranged in a matrix.

The device 10 comprises: a detection unit 11 configured to detect whether a touch electrode has a touch area with a capacitance variation value larger than or equal to a predetermined value; an obtaining unit 12 configured to acquire a number of the touch areas with a capacitance variation value larger than or equal to a predetermined value, in condition that such touch areas exist; an outputting unit 13 configured not to output a electrical signal of a touch area in condition that the number of the touch areas is one, and output electrical signals of multiple touch areas, in condition that the number of the touch areas is multiple; and an analyzing unit 14 configured to determine on the outputted electrical signals to decide whether to generate a touch signal, or not.

For example, the analyzing unit comprises: a determining sub-unit 141 configured to determine whether all of the outputted electrical signals are from separate touch areas; and a signal generating sub-unit 142 configured to generate a touch signal in condition that not all of the outputted electrical signals are from separate touch areas, and not generate a touch signal in condition that all of the outputted electrical signals are from separate touch areas.

For example, the signal generating sub-unit 142 determines adjacent touch areas from the multiple touch areas, and generates a touch signal based on an electrical signal outputted from a location of a touch area at a substantial center of the adjacent touch areas, in condition that not all of the outputted electrical signals are from separate touch areas.

For example, the signal generating sub-unit 142 determines adjacent touch areas from the multiple touch areas, and generates a touch signal based on an electrical signal outputted from a location of a touch area with a largest capacitance variation value of the adjacent touch areas, in condition that not all of the outputted electrical signals are from separate touch areas.

For example, the touch determining device 10 further comprises: a recording unit 15 configured to record a location of a touch area in condition that the number of the touch areas is one, and record locations of separate touch areas in condition that the number of the touch areas is multiple.

For example, the touch panel comprises at least one first touch electrode and at least one second touch electrode, any of the first touch electrodes and any of the second touch electrodes overlap with each other to form one touch area.

An embodiment of the disclosure also provides a display device comprising any of the touch determining device 10.

It is noted that the display device of the embodiment may be an e-paper, a mobile phone, a tablet PC, a television, a notebook PC, a digital photoframe, a navigator and any product or component having a display function.

The technical solutions of the embodiments of the disclosure are described in detail with reference to the drawings, considering the problem of the short circuit of the electrodes and the suspension blocks caused by the metal particles, which may further cause wrong determination of the touch signal. According to the technical solutions of the embodiments of the disclosure, an actual, or purpose touch operation is determined only when there are multiple touch areas with capacitance variation values larger than or equal to a predetermined value in the touch electrode, and then a touch signal is generated. It avoids generating wrong control signals due to the short circuit of the suspension blocks and the electrode, to allow the accuracy of the generated touch signals.

A person skilled in relevant art will understand that the embodiments of the disclosure may be implemented as a method, an apparatus (device) or a computer program product. Therefore, the disclosure may have hardware-only embodiments, software-only embodiments or software plus hardware embodiments. Moreover, the disclosure may be in a form of a computer program product embodied on one or more computer readable storage media (comprising but not limited to Disc memory, CD-ROM, optical memory, or the like) comprising computer readable program codes.

The disclosure is described herein with reference to flowchart charts and/or block diagrams of methods, apparatuses (systems), and computer program products according to the embodiments of the disclosure. It is understood that each flow and/or block in the flowchart and/or block diagram, and a combination of flow and/or block in the flowchart and/or block diagram can be implemented by computer program instructions. These computer program instructions may be provided to a general purpose computer, a special purpose computer, an embedded processor or a processor of other programmable data processing apparatus to form a machine, such that devices for implementing functions specified by one or more flows in the flowchart and/or one or more blocks in the block diagram may be generated by executing the instructions with the processor of the computer or other programmable data processing apparatus.

These computer program instructions may also be stored in a computer-readable memory that can direct the computer or other programmable data processing apparatus to operate in a given manner, so that the instructions stored in the computer-readable memory produce a manufactured article comprising an instruction device, and the instruction device implements the functions specified by one or more flows in the flowchart and/or one or more blocks in the block diagram.

These computer program instructions may also be loaded onto the computer or other programmable data processing apparatus, such that a series of process steps may be executed on the computer or other programmable data processing apparatus to produce process implemented by the computer, thereby, the instructions executed on the computer or other programmable data processing apparatus provide steps of implementing the functions specified by one or more flows in the flowchart and/or one or more blocks in the block diagram.

The described above are only exemplary embodiments of the present disclosure, and the present disclosure is not intended to be limited thereto. For one of ordinary skill in the art, various changes, equivalent alternations and improvement may be made without departing from the technical scope of the present disclosure, and all of these changes, equivalent alternations and improvement shall fall within the scope of the present disclosure.

The present application claims priority to the Chinese Application No. 201610005371.8, filed on Jan. 5, 2016 and entitled "Touch Determining Device and Method, and Display Device", the disclosure of which is incorporated herein by reference in its entirety.

The invention claimed is:

1. A touch determining device for a touch panel, wherein the touch panel comprises a plurality of touch areas arranged in a matrix, and the device comprises:
   a detecting unit configured to detect whether a touch electrode has a touch area with a capacitance variation value larger than or equal to a predetermined value;
   an acquiring unit configured to acquire a number of the touch areas with a capacitance variation value larger than or equal to a predetermined value, in condition that such touch areas exist;
   an outputting unit configured to not output an electrical signal, in condition that the number of the touch areas is one, and output electrical signals of the multiple touch areas, in condition that the number of the touch areas is multiple; and an analyzing unit configured to determine on the outputted electrical signals to decide whether to generate a touch signal, or not.

2. The touch determining device according to claim 1, wherein the analyzing unit comprises:
   a determining sub-unit configured to determine whether all of the outputted electrical signals are from separate touch areas, or not; and
   a signal generating sub-unit configured to generate a touch signal in condition that not all of the outputted electrical signals are from separate touch areas, and not generate a touch signal in condition that all of the outputted electrical signals are from separate touch areas.

3. The touch determining device according to claim 2, wherein the signal generating sub-unit is configured to determine adjacent touch areas from the multiple touch areas, and generate a touch signal based on an electric signal outputted from a location of a touch area at the substantial center of the adjacent touch areas, in condition that not all of the outputted electrical signals are from separate touch areas.

4. The touch determining device according to claim 2, wherein the signal generating sub-unit is configured to determine adjacent touch areas from the multiple touch areas, and generate a touch signal based on an electric signal outputted from a location of a touch area with a largest capacitance variation value of the adjacent touch areas, in condition that not all of the outputted electrical signals are from separate touch areas.

5. The touch determining device according to claim 4, further comprising:
   a recording unit configured to record a location of a touch area in condition that the number of the touch areas is one, and record locations of separate touch areas in condition that the number of the touch areas is multiple.

6. The touch determining device according to claim 5, wherein the touch panel comprises at least one first touch electrode and at least one second touch electrode, any of the at least one first touch electrode and any of the at least one second touch electrode overlap with each other to form one touch area.

7. The touch determining device according to claim 1, further comprising:
   a recording unit configured to record a location of a touch area in condition that the number of the touch areas is one, and record locations of separate touch areas in condition that the number of the touch areas is multiple.

8. The touch determining device according to claim 1, wherein the touch panel comprises at least one first touch electrode and at least one second touch electrode, any of the at least one first touch electrode and any of the at least one second touch electrode overlap with each other to form one touch area.

9. A display device comprising a touch determining device for a touch panel, wherein the touch panel comprises a plurality of touch areas arranged in a matrix, and the device comprises:
   a detecting unit configured to detect whether a touch electrode has a touch area with a capacitance variation value larger than or equal to a predetermined value;
   an acquiring unit configured to acquire a number of the touch areas with a capacitance variation value larger than or equal to a predetermined value, in condition that such touch areas exist;
   an outputting unit configured to not output an electrical signal, in condition that the number of the touch areas is one, and output electrical signals of the multiple touch areas, in condition that the number of the touch areas is multiple; and
   an analyzing unit configured to determine on the outputted electrical signals to decide whether to generate a touch signal, or not.

10. The touch determining device according to claim 9, wherein the analyzing unit comprises:
    a determining sub-unit configured to determine whether all of the outputted electrical signals are from separate touch areas, or not; and
    a signal generating sub-unit configured to generate a touch signal in condition that not all of the outputted electrical signals are from separate touch areas, and not generate a touch signal in condition that all of the outputted electrical signals are from separate touch areas.

11. The touch determining device according to claim 10, wherein the signal generating sub-unit is configured to determine adjacent touch areas from the multiple touch areas, and generate a touch signal based on an electric signal outputted from a location of a touch area at the substantial center of the adjacent touch areas, in condition that not all of the outputted electrical signals are from separate touch areas.

12. The touch determining device according to claim 10, wherein the signal generating sub-unit is configured to determine adjacent touch areas from the multiple touch areas, and generate a touch signal based on an electric signal outputted from a location of a touch area with a largest capacitance variation value of the adjacent touch areas, in condition that not all of the outputted electrical signals are from separate touch areas.

13. The touch determining device according to claim 12, further comprising:
    a recording unit configured to record a location of a touch area in condition that the number of the touch areas is one, and record locations of separate touch areas in condition that the number of the touch areas is multiple.

14. The touch determining device according to claim 13, wherein the touch panel comprises at least one first touch electrode and at least one second touch electrode, any of the at least one first touch electrode and any of the at least one second touch electrode overlap with each other to form one touch area.

15. The touch determining device according to claim 9, further comprising:
    a recording unit configured to record a location of a touch area in condition that the number of the touch areas is one, and record locations of separate touch areas in condition that the number of the touch areas is multiple.

16. The touch determining device according to claim 9, wherein the touch panel comprises at least one first touch electrode and at least one second touch electrode, any of the at least one first touch electrode and any of the at least one second touch electrode overlap with each other to form one touch area.

* * * * *